(No Model.)  3 Sheets—Sheet 2.

F. B. MILES.
LATHE.

No. 280,211.  Patented June 26, 1883.

WITNESSES:
Thomas Dugan
Harry Smith

INVENTOR:
Frederick B. Miles
by his attorneys
Howson and Sons (No Model.) 3 Sheets—Sheet 3.
F. B. MILES.
LATHE.
No. 280,211. Patented June 26, 1883.
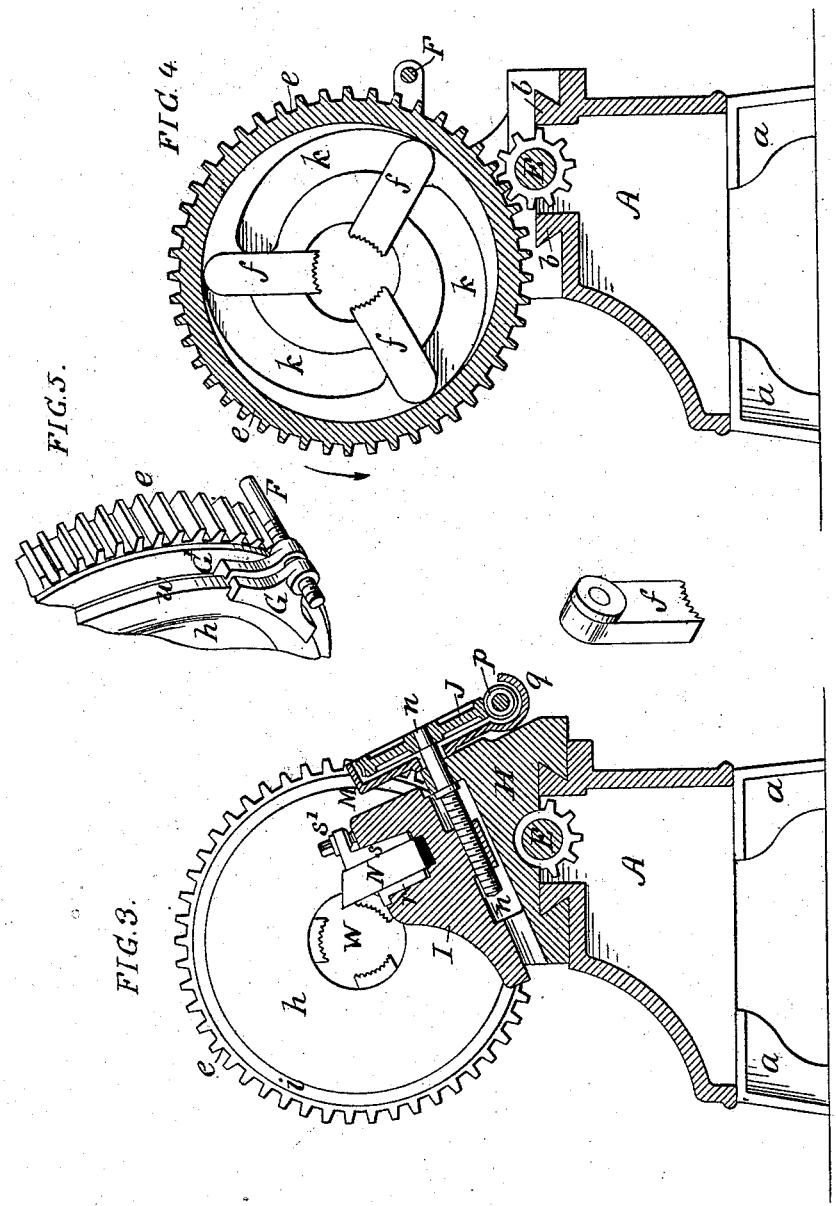
WITNESSES:
Thomas Dugan
Harry Smith
INVENTOR:
Frederick B. Miles
by his attorneys
Howson and Son

UNITED STATES PATENT OFFICE.

FREDERICK B. MILES, OF PHILADELPHIA, PENNSYLVANIA.

LATHE.

SPECIFICATION forming part of Letters Patent No. 280,211, dated June 26, 1883.

Application filed January 8, 1883. (No model.)

*To all whom it may concern:*

Be it known that I, FREDERICK B. MILES, a citizen of the United States, and a resident of Philadelphia, Pennsylvania, have invented a Lathe for Cutting Off Shafts, Axles, &c., of which the following is a specification.

My invention consists, mainly, of a lathe in which a universal chuck is so geared to a driving-shaft that the object to be operated on by the cutting-tool will be gripped and centered by and driven through the medium of the chuck.

Figure 1:
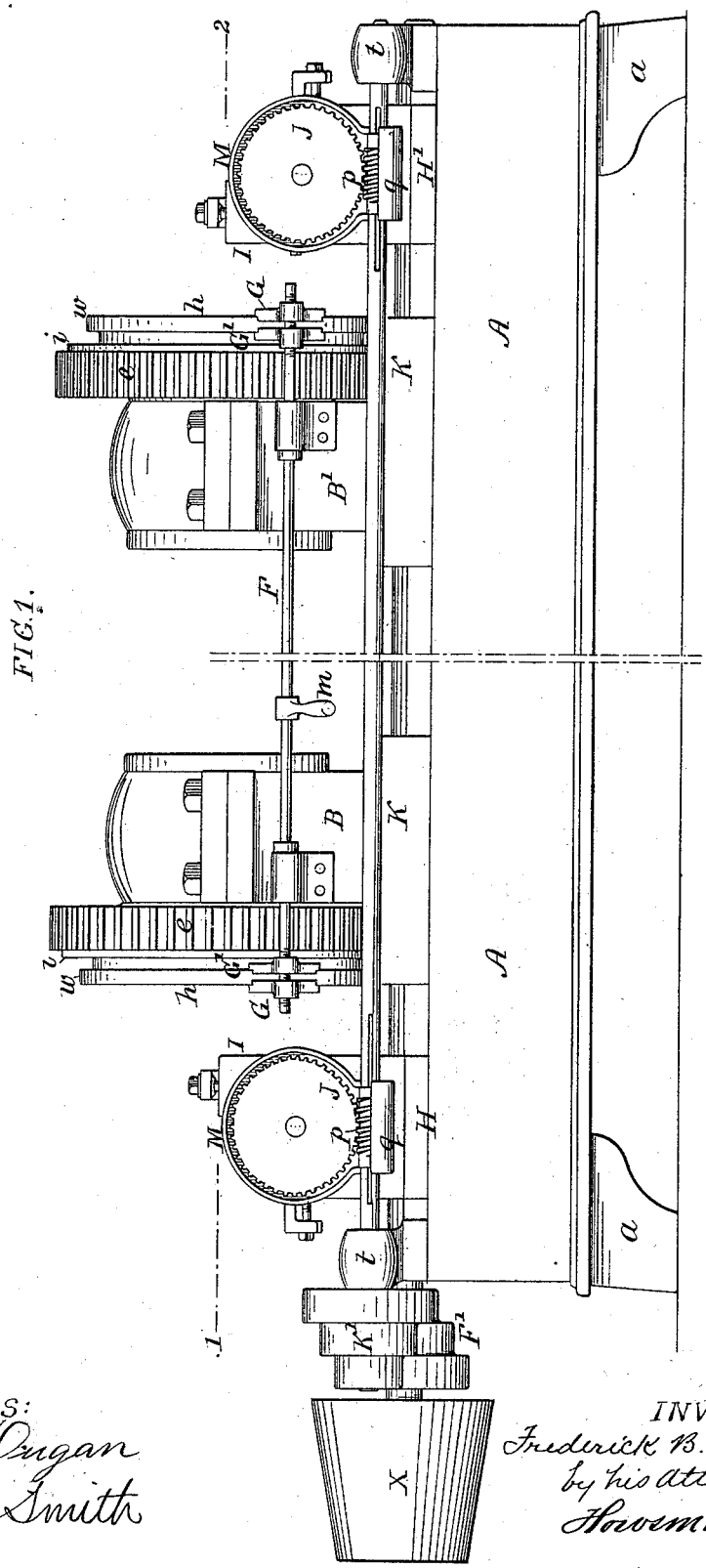
Figure 2:
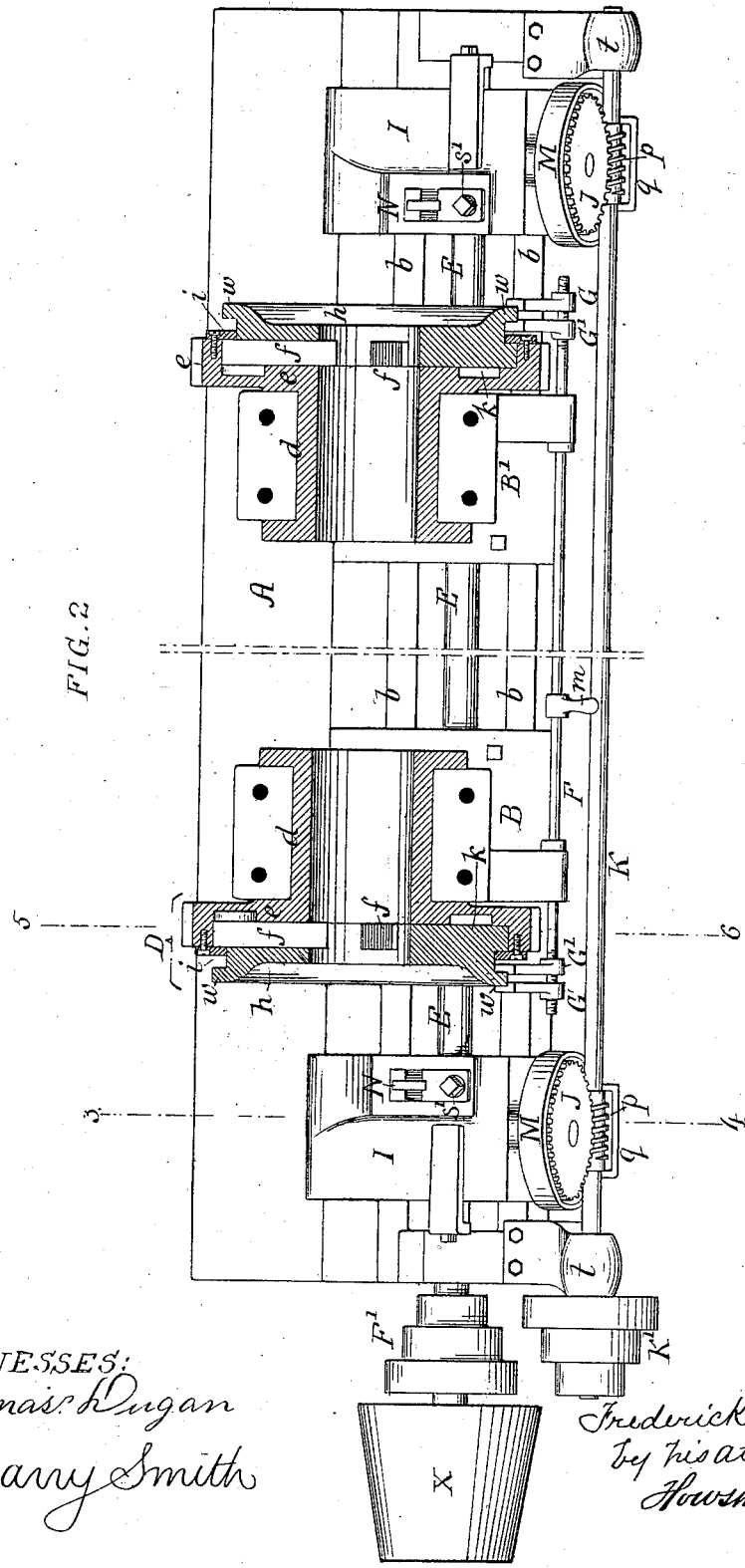

In the accompanying drawings, Figure 1, Sheet 1, is a front view of a lathe illustrating my invention; Fig. 2, Sheet 2, a sectional plan on the line 1 2, Fig. 1; Fig. 3, Sheet 3, a transverse section on the line 3 4, Fig. 2; Fig. 4, a transverse section on the line 5 6, Fig. 2; and Fig. 5, a perspective view of part of the mechanism connected with the lathe.

The bed A of the lathe is supported on suitable legs, $a$, and guides $b\ b$, each having an outer beveled edge, are formed on the top of the bed, and extend throughout the entire length of the same.

Two head-stocks, B and B', are secured to the bed of the lathe, and are adapted to the guides $b$, so that they can be adjusted when necessary. It may be stated here that the two head-stocks are not essential in carrying out my invention, as one head-stock only may be used where the object to be severed is short, as will appear hereinafter; but as two head-stocks will in most cases be employed I will describe the machine as illustrated in the drawings. Each head-stock affords a bearing for the tubular journal $d$ of a universal chuck, D, which consists of a recessed disk, $e$, forming part of the said tubular journal, the three jaws $f$, and a plate, $h$, secured to the face of the disk, in the present instance by means of a ring, $i$, and set-screws passing through the ring and into the disk. The plate $h$ is recessed so as to form radial guides for the jaws, and the back of each jaw is provided with a pin and an anti-friction roller adapted thereto, the roller fitting into one of three curved grooves, $k$, formed in the disk. In construction this chuck is in many respects similar to well-known universal chucks. Its application, however, as a medium through which the shaft or axle passed through the chuck and its journal is self-centered and driven constitutes the main feature of my invention. The universal chucks of both head-stocks are precisely alike.

A horizontal driving-shaft, E, has its bearings one near each end of the machine, and is provided with two pinions, one for gearing into teeth on the periphery of the disk $e$ of one universal chuck, and the other for gearing into the teeth on the periphery of the disk of the other universal chuck.

Two carriages, H H', are adapted to the guides $b$ of the bed-plate, and are secured to the latter, after adjustment, by any suitable appliances. To inclined guides on each carriage is adapted a tool-holding slide, I, controlled by a screw-spindle, $n$, which is arranged to turn in a bearing on the carriage, and to which is secured a worm-wheel, J.

A horizontal shaft, K, has its bearings $t\ t$, one at each end of the base-plate, and this shaft has two worms, $p$, one gearing into the worm-wheel J of one carriage and the other into the like wheel of the other carriage. Each worm-wheel has a key or feather adapted to a groove in the shaft K, and the worm is partly contained within a cup-like projection, $q$, on the carriage, and is confined longitudinally within the same, so that when the carriage is adjusted on the bed-plate it will be accompanied with the worm.

I prefer to make the projection $q$ part of a guard, M, which partly surrounds the worm-wheel, and is secured to the carriage, as shown in Fig. 3.

The tool N, which consists in the present instance of a flat and comparatively thin piece of steel properly shaped at its cutting end, is contained within a recess in the holding-slide I, and confined between a packing-piece, $r$, and a taper key, $s$, which is forced into place by a screw, $s'$, in a manner which will be readily understood without explanation. After passing the shaft, the end portions of which have to be cut off, through both universal chucks, the disks $e$ of the latter may be driven in a direction the reverse of that indicated by the arrow, Fig. 4, when, if any braking device be applied to the plates $h$ of the chucks, the jaws will seize and center the shafts, and the moment the cutting-tools are presented to the shaft there will be a constant tendency of the jaws to maintain their hold of the shaft without the aid of braking mechanism.

It will now be seen that the main feature of the invention consists in the driving of the axle or shaft to be severed through the medium of chucks, which at once center and grip the shaft without any of the centering devices which in lathes of this class have been heretofore resorted to, and by which the chucking and centering of the shaft cannot be accomplished in less time than is required to cut off the shaft.

I prefer the device which I will now proceed to describe for applying friction to the plates $h$ of the chuck in the first instance, in order to induce the jaws to seize and center the shaft before the application of the cutting-tools thereto. A shaft, F, provided with a handle, $m$, has its bearings in the two head-stocks, and near each end of this shaft are cut right and left handed screw-threads, one for controlling a segmental brake-shoe, G, and the other for controlling a like shoe, G', an annular rib, $w$, on the plate $h$ of one chuck being between the shoes near one end of the shaft F, and a similar rib on the plate of the other chuck being between the like shoes near the opposite end of the shaft. The inner faces of each pair of shoes are recessed for receiving part of the rib, which thus maintains the said shoes in proper position and prevents them from turning on the shaft. This will be best understood by reference to the perspective view, Fig. 5. A shaft to be operated on by the machine—the axle W of a locomotive, for instance—having been passed through both chucks and their cylindrical journals, and the latter being rotated, the attendant so moves the shaft F that the brake-shoes G G' at each end of the machine will, owing to the right and left handed threads which control them, approach each other, and the annular ribs of both chucks will be simultaneously grasped by and between the shoes, and will be held while the chucks continue to rotate, and the result of this will be the simultaneous forward radial movement of the jaws of both chucks and the gripping and centering of the shaft to be operated on. The moment the shaft or axle is seized the plates $h\,h$ of the two chucks must turn therewith in spite of the brake-shoes, the friction of which on the annular ribs, however, is too slight to present any obstacle to the turning of the chucks, and the shoes may be withdrawn from the ribs of the chucks by operating the handle $m$ the moment the chucking of the shaft to be operated on is assured. When the cutting-tools are applied to the shaft, the force exerted to turn the same tends to tighten the hold of the jaws of the chuck on the said shaft.

The main shaft E has a speed-pulley, F'', and a corresponding speed-pulley, K', is secured to the shaft K, so that by changing the position of the belt which passes round both pulleys the feeding of the tool-carrying slide may be increased or diminished.

I prefer in all cases to secure to the main shaft a tapering pulley, X, for receiving a belt from a like pulley on any neighboring driving-shaft, and to provide a belt-shifter for so changing the position of the belt that the shaft E will gradually increase in speed as the cutting-tool approaches the center of the shaft. This is a well-known device, and forms no part of my invention, and hence need not be described in detail. This belt-shifter may be operated from the shaft of the lathe through the intervention of any appropriate mechanism.

As before remarked, the cutting-off lathe will generally require two centering-chucks and two slide-rests, each carrying a cutting-tool; but a lathe with one centering-chuck and one slide-rest may be used for severing short objects.

I claim as my invention—

1. The combination, in a lathe, of a universal chuck having a tubular journal adapted to a bearing on the lathe-bed, and having radial dies for gripping the object to be operated on, with a driving-shaft geared to that part of the chuck which imparts the radial movement of the said dies, substantially as set forth.

2. The combination, in a lathe, of two universal chucks, each having a tubular journal adapted to a bearing on the bed of the lathe, and each having radial dies, with a driving-shaft geared to that portion of each chuck which imparts the radial movement of the dies, substantially as specified.

3. The combination of two chucks having tubular journals adapted to bearings in a head-stock, and each having jaw-carrying plates $h$, with two pairs of brake-shoes, G G', one pair adapted to a rib, $w$, on the plate $h$ of one chuck, and the other pair adapted to a similar rib on the plate $h$ of the other chuck, and with a shaft, F, having its bearings in the head-stock, and having right and left-handed screw-threads for controlling each pair of shoes, substantially as set forth.

4. The combination, in a lathe, of two head-stocks, each carrying a chuck, two carriages, H, each having a tool-holding slide, and a screw-spindle for controlling the same, with a shaft, K, driven from the main shaft of the machine and geared to both screw-spindles, substantially as specified.

5. The combination of the bed of the lathe, and the two carriages H, adjustable thereon, each carriage having a tool-carrying slide and a screw-spindle for controlling the slide, and each spindle having a worm-wheel, J, with a shaft, K, having a worm for each wheel, the said worms turning with the shaft, but sliding thereon when the carriages are adjusted, all substantially as set forth.

In testimony whereof I have signed my name to this specification in the presence of two subscribing witnesses.

FREDK. B. MILES.

Witnesses:
THOMAS DUGAN,
HARRY SMITH.